(12) United States Patent
Hyser et al.

(10) Patent No.: US 9,954,757 B2
(45) Date of Patent: Apr. 24, 2018

(54) SHARED RESOURCE CONTENTION

(71) Applicant: Hewlett-Packard Development Company, L.P., Houston, TX (US)

(72) Inventors: Christopher D. Hyser, Victor, NY (US); Jerome Rolia, Kanata (CA); Diwakar Krishnamurthy, Calgary (CA); Joydeep Mukherjee, Calgary (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 85 days.

(21) Appl. No.: 14/759,659

(22) PCT Filed: Jan. 23, 2013

(86) PCT No.: PCT/US2013/022766
§ 371 (c)(1),
(2) Date: Jul. 8, 2015

(87) PCT Pub. No.: WO2014/116215
PCT Pub. Date: Jul. 31, 2014

(65) Prior Publication Data
US 2015/0350055 A1 Dec. 3, 2015

(51) Int. Cl.
| | |
|---|---|
| G06F 15/173 | (2006.01) |
| H04L 12/26 | (2006.01) |
| H04L 12/911 | (2013.01) |
| G06F 9/44 | (2018.01) |
| G06F 11/00 | (2006.01) |
| G06F 9/50 | (2006.01) |
| G06F 9/455 | (2018.01) |

(52) U.S. Cl.
CPC ............. *H04L 43/12* (2013.01); *G06F 9/44* (2013.01); *G06F 9/45558* (2013.01); *G06F 9/5088* (2013.01); *G06F 11/00* (2013.01); *H04L 43/0876* (2013.01); *H04L 47/78* (2013.01); *G06F 2009/4557* (2013.01); *G06F 2009/45591* (2013.01); *G06F 2209/508* (2013.01)

(58) Field of Classification Search
CPC ..... H04L 43/12; H04L 43/0876; H04L 47/78; G06F 9/44; G06F 9/45558; G06F 9/5088; G06F 11/00; G06F 2009/4557; G06F 2009/45591; G06F 2209/508
USPC ........................................................ 709/224
See application file for complete search history.

(56) References Cited

U.S. PATENT DOCUMENTS

| | | |
|---|---|---|
| 6,785,880 B1 | 8/2004 | Beisiegel et al. |
| 7,240,094 B2 | 7/2007 | Hackney et al. |

(Continued)

FOREIGN PATENT DOCUMENTS

WO    WO-2012125144    9/2012

OTHER PUBLICATIONS

International Searching Authority, The International Search Report and the Written Opinion, dated Aug. 28, 2013, 9 Pages.

(Continued)

*Primary Examiner* — S M Rahman
(74) *Attorney, Agent, or Firm* — Mannava & Kang, P.C.

(57) ABSTRACT

Contention for shared resources in a shared resource environment may be determined based on measurements from a probe running in the shared resource environment. The measurements can be compared to benchmarks, and a contention value may be determined based on the comparison.

18 Claims, 4 Drawing Sheets

(56) References Cited

U.S. PATENT DOCUMENTS

| | | | |
|---|---|---|---|
| 8,099,487 B1 | 1/2012 | Smirnov et al. | |
| 9,268,542 B1* | 2/2016 | Mars | G06F 9/5016 |
| 2009/0089788 A1 | 4/2009 | Turner | |
| 2010/0287263 A1 | 11/2010 | Liu et al. | |
| 2011/0035248 A1 | 2/2011 | Juillard | |
| 2011/0055838 A1* | 3/2011 | Moyes | G06F 9/4881 |
| | | | 718/102 |
| 2011/0131570 A1 | 6/2011 | Heim | |
| 2011/0225299 A1 | 9/2011 | Nathuji et al. | |
| 2011/0258621 A1 | 10/2011 | Kern | |
| 2012/0023492 A1 | 1/2012 | Govindan et al. | |
| 2012/0144489 A1 | 6/2012 | Jarrett et al. | |
| 2012/0159454 A1 | 6/2012 | Barham et al. | |
| 2012/0215911 A1 | 8/2012 | Raleigh et al. | |
| 2015/0081980 A1* | 3/2015 | Walker | G06F 12/0802 |
| | | | 711/135 |
| 2015/0186242 A1* | 7/2015 | Funk | G06F 11/3089 |
| | | | 702/186 |
| 2015/0263993 A1* | 9/2015 | Kuch | H04L 49/354 |
| | | | 709/225 |

OTHER PUBLICATIONS

Mehndiratta, S., Enhanced Quality of Service (QoS) in Windows Server 2012, (Research Paper), Oct. 2, 2012, 3 Pages.

* cited by examiner

SHARED RESOURCE CONTENTION

BACKGROUND

Large scale shared resource pools such as private and public clouds are being used to host many kinds of applications. In many instances, virtualization is employed in the resource pools. Virtual machines (VMs) are created and run on a physical machine to host applications. A VM is a software implementation of a machine that executes programs like a physical machine. VMs may be used to run multiple OS environments on the same computer in isolation from each other and each VM may host one or more applications. It is common for modern processors to run virtual machines, and the VMs may share caches, memory, and other resources.

BRIEF DESCRIPTION OF THE DRAWINGS

Embodiments are described in detail in the following description with reference to the following figures. The figures show examples of the embodiments and like reference numerals indicate similar elements in the accompanying figures.

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments.

According to an embodiment, a probe is used to determine contention amongst resource consumers in a contention region in a shared resource environment. The contention region is comprised of shared resources in the shared resource environment. Resource consumers include any item utilizing the shared resources, such as applications running on a server or VMs and applications running on the VMs. The probe for example comprises code running in the contention region simulating a resource consumer. The probe utilizes the shared resources concurrently with the resource consumers to take measurements used to determine contention amongst the resource consumers for the shared resources. Contention for example is the interference between the resource consumers concurrently utilizing the shared resources that cause the resource consumers to behave differently together than in isolation. Contention can cause performance or quality of service (QoS) of the resource consumers to degrade below a benchmark (e.g., threshold).

Resource consumers may include VMs. Shared resources, such as an L3 cache, a virtual machine monitor, memory or a network interface, typically are not provisioned for each VM but are still used by all the VMs. The resource sharing may cause degradation of VM QoS. For example, if multiple VMs share an L3 cache or share a memory and one VM is dominating the cache and/or memory access, the performance of applications executed by the other VMs may suffer. Probe measurements may be used to determine contention, and VM provisioning decisions may be made based on the performance measured by the probe. For example, a VM may be migrated outside the contention region, such as to another socket or machine, to improve QoS. In a cloud system, provisioning based on the probe measurements can be used to improve QoS and to meet service level agreement performance benchmarks.

Figure 1:
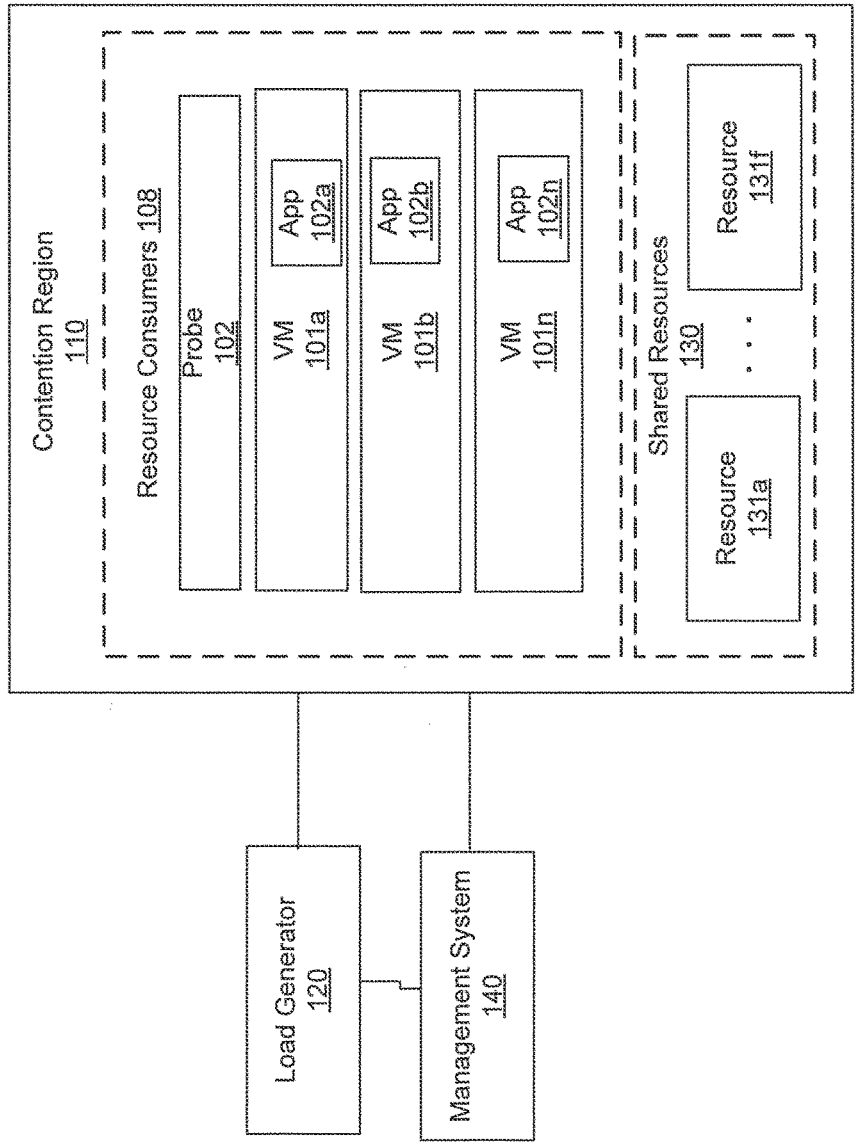
FIG. 1 illustrates a system.

FIG. 1 illustrates a shared resource environment contention determination system 100. The system 100 comprises a shared resource environment including a contention region 110. The contention region 110 includes shared resources 130 that are shared by resources consumers 108, which in this example include VMs 101*a-n* and the probe 102. In other examples, the contention region does not include VMs and may comprise a single machine or multiple machines where multiple workloads are being consolidated. A resource consumer may include an application utilizing the shared resources but not running in a VM. The shared resources 130 comprise shared resources 131*a-f*, such as memory, hierarchal caches (e.g., L3 cache and/or L1-L2 caches), cores, virtual machine monitor, network interface (e.g., MC), servers, paths through a hypervisor or any resource that is shared. A probe 102 also shares the shared resources 130 with the VMs 101*a-n*. The VMs 101*a-n* may each run one or more applications, such as applications 102*a-n*. The contention region 110 may be provided in a distributed computing system, such as a cloud system. The VMs may be provisioned to run workloads of users of the distributed computing system. For example, users may need to run the applications 102*a-n* and VMs are provisioned on the shared resources 130 to run the applications to accommodate the demand of the users.

The probe 102 for example comprises machine readable instructions executed to simulate a workload on the shared resources 130. For example, the probe 102 is computer code that simulates operations of an application running on a VM in the contention region 110. The probe 102 may contend for the shared resources 130 with the VMs 101*a-n*. As the contention for the shared resources 130 increases, it may cause degradation in performance of the applications 102*a-n* and the probe 102. The measurements performed by the probe 102 may indicate an amount of contention and the degradation in performance.

The probe 102 may be tuned to make the measurements depending on the shared resources being measured. The probe may be tuned according to the type of resource and attributes of the resource. For example, the probe 102 may make measurements for accessing an L3 cache. The probe 102 is tuned for the cache size attribute. If the L3 cache is 8 MB and the L3 cache is tuned for the incorrect size, such as 16 MB, then the measurements may not be accurate. The probe 102 may be tuned through an automated process or a process involving user input to vary parameters during tuning.

A load generator 120 determines measurements from or using the probe 102, compares the measurements to benchmarks, and can determine a contention value indicative of an amount of contention among the resource consumers 108 running in the contention region 110. The benchmarks may be baseline measurements made by the probe 102 if the probe was not in contention with the VMs 101*a-n*. For example, the probe 102 is executed without the resource consumers 108 and makes performance measurements of the shared resources 130 to determine the benchmarks. The load generator 120 may compare the measurements made by the probe 102 when sharing the resources 130 with the benchmarks. Any statistically significant deviation between these sets of measures can be reported to a management system 140 with information on the type of resource contention that is present, thus allowing the management system 140 to initiate actions to remedy the problem, such as migrating a VM to another machine. In one example, the load generator 120 controls the probe 102 to execute at specific times to measure performance of the shared resources. The load generator 120 for example is deployed on a separate host distinct from the contention region 110. The load generator 120 may support multiple probes. A contention region may have more than one probe, however, the probe 102 may perform multiple different measurements to characterize a number of shared resources. Also, the load generator 120 may support probes in different contention regions. Some examples of the measurements determined performed using the probe 102 include response time and throughput. The probe 102 can alternate between phases of measuring different metrics, and the alternating may be controlled by the load generator 120 instructing the probe 102 or may be determined by the probe itself. For example, one phase may be a connection phase include measuring probe response times. For example, for the connection phase, the load generator 120 submits requests to the probe 102 and measures the probe's response time. In this example, contention is determined from this external measure of the probe's response time. This connection phase may include sensing contention at a virtual machine monitor related to TCP/IP connections. One example of a virtual machine monitor is Kernel Virtual Memory (KVM) in LINUX. The virtual machine monitor is one of the shared resources 130. A memory phase may measure contention for a memory or a cache (e.g., L3 cache). In one example, the response time to retrieve requested data from a memory or a cache is determined. The response time is measured by the probe 102. To test an L3 cache, for example, the probe 102 may execute a script in a loop that accesses memory in a way that uses a lot of L3 cache. The higher the response time, the greater the number of cache misses are inferred. The probe 102 can report its response times to the load generator 120. The load generator 120 can control which phase the probe 102 is in and is able to communicate any inferred performance degradations to the management system 140.

Figure 2:
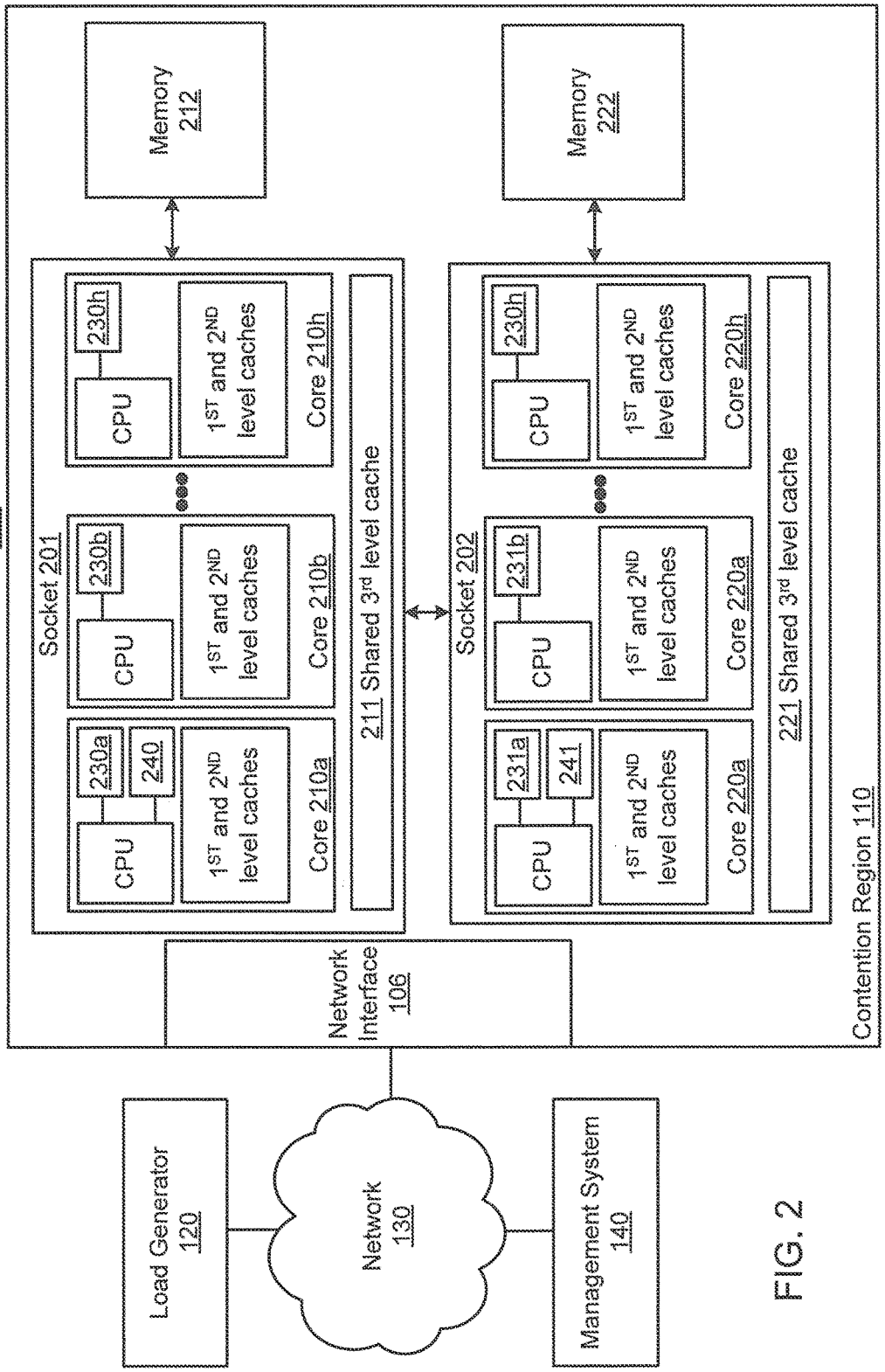
FIG. 2 illustrates a system including sockets sharing resources.

Modern processors have adopted multi-socket architectures with non-uniform memory access (NUMA) and level 3 (L3) caches shared by the CPU cores of each socket. FIG. 2 shows an example of the system 100 including a socket or multiple sockets comprising the shared resources 130 in the contention region 110. The contention region 110 in other examples may comprise multiple servers or another set of shared resources. Referring to FIG. 2, sockets 201 and 202 are shown. The shared resources 130 include CPU cores 210a-h and 220a-h. Other shared resources include the L3 caches 211 and 221 and memories 212 and 222. A socket may comprise a physical package or chip including the CPU cores and L3 cache. Sockets may participate in inter-socket communications. In one example, each of the sockets 201 and 202 are a separate contention region and in another example, the sockets 201 and 202 together represent the contention region 110.

Multiple VMs may be assigned per socket and each socket may include a probe. For example, VMs 230a-h run on cores 210a-h and probe 240 runs on core 210a. VMs 231a-h run on cores 220a-h and probe 241 runs on core 220a. VMs may be pinned to the near memory to improve performance. The probes 240 and 241 may report measures of their own internal performance to the load generator 120. Also, the load generator 120 may measure response times or throughputs of probes 240 and 241. The load generator 120 may send contention values to the management system 140 and the management system 140 may make VM provisioning decisions based on the contention values.

Tuning of a probe, such as probes 102, 240, or 241, is now described according to an example with respect to the connection phase and the memory phase for probe measurements. Other techniques may be used to tune the probe and the probe may be tuned for determining measurements other than connection rates and memory access time/cache misses. The probe may comprise a low overhead application capable of measuring metrics indicating contention among unmanaged shared resources. Parameters for the probe, e.g., c, t1, and t2 described below, may be optimized in a one factor at a time manner until the probe has low resource utilization yet correctly reports the degradations as incurred by the micro-benchmark VMs. For example, micro-benchmarks are applications. Each micro-benchmark is designed to stress a particular shared resource. To tune one of the probe's phases, a corresponding microbenchmark is increased until performance degradation is observed. This process is repeated again but with the probe in place.

One example of tuning the probe for the connection phase is now described. In the connection phase, a web server instance within the probe is subjected to a burst of c Web connections per second (cps) over a period of t1 seconds. The web server instance services a connection request by executing a CPU-bound PHP script. One example of tuning the probe in the memory phase comprises the probe executing a script that traverses an array of integers of size n for t2 seconds, where n is related to the L3 cache size for the socket. In this example, the value of n is chosen so as to cause a L3 miss rate of 0.1. The values of c, t1, n, and t2 are carefully tuned for each type of server in a resource pool such that the probe imposes low overhead while having the ability to identify contention among VMs.

In one example, the parameters of the probe are automatically tuned so that the probe 102 alternates between its connection and memory phases. Specifically, for tuning c and t1 for the connection phase, a controlled experiment is setup involving the application-intensive web microbenchmark. Without using the probe, two scenarios are identified with one VM per core, one with an arrival rate per VM that does not have a performance discontinuity and one with an arrival rate that does. The discontinuity is a performance discontinuity. For example, based on an experiment, up to a load of 160 cps per VM there is no significant change in the mean response time of VMs. The per-core utilization at this load level is 0.75. However, there is significant increase in mean response time at a load of 165 cps per VM. A large c value is a cps that when added to the first case causes the discontinuity. t1 is set to be the entire duration of the micro-benchmark's execution. The probe is executed for the scenario without the discontinuity. The c value is progressively decreased till the probe does not introduce any performance degradation for the VMs. Next, the probe is run with this setting for the other scenario with the performance discontinuity. The value of t1 is now progressively decreased up to the point the probe is able to still identify the problem. A similar approach of using a caching or memory micro-benchmark for selecting n first followed by t2 later is adopted for tuning the memory phase of the probe.

The probes may be used to determine measurements for example in a connection and a memory phase. For example, the load generator 120 determines the measurements and determines a contention value from the measurements. The contention value for example is indicative of an amount of contention for a shared resource amongst the resource consumers and can be used to determine an actual capacity of the shared resources. Contention values can be sent to the management system 140. The contention values may indicate whether the contention exceeds a threshold. For example, the amount of contention may be used to report degradations beyond a threshold to the management system 140. The management system 140 may include a scheduler that provisions VMs. Provisioning decisions may be based on the measurements.

A contention value determined from the measurements may include the actual capacity, which can be used to determine whether another VM can be provisioned in the contention region and still maintain a particular QoS. For example, f is a contention value; f=1 means no contention and the resource consumers are behaving as if running in isolation; and an f of greater than 1 means there is contention for the shared resources. No contention means a resource consumer gets access to a shared resource as if no other resource consumer is using it. Contention may include some degradation in performance from the no contention operation. For example, instead of completing 1 job per hour, an application completes 0.8 of the job per hour.

In one example, the management system 140 may characterize CPU capacity requirements using numerical values referred to as shares. Shares are treated as "additive" so the total number of shares represent the total capacity. Assume C is the number of host CPU shares, P is the number of shares already provisioned, and N the number of shares required for an additional VM. Then after provisioning the host's available capacity A, A=C−f(P+N). f is the contention value. So if f=1, e.g., no contention, then A=C−f(P+N). If f is greater than one then there is contention and the actual available capacity is measured as a function of contention. If f=2, this represents that the actual available capacity is half of what it is when compared to a no contention scenario. The f value may be determined from the measurements from the probe and the comparison to a benchmark. For example, if a measured response time is twice as long as a benchmark, then f may be set to 2.

Figure 3:
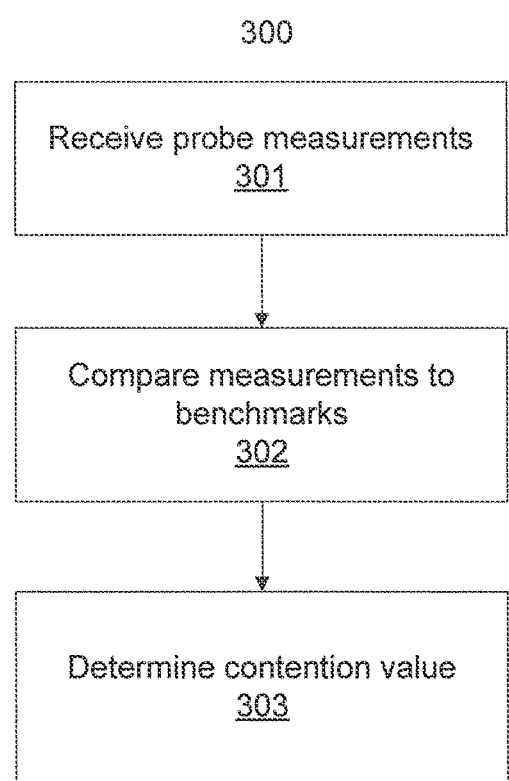
FIG. 3 illustrates a flow chart of a method.

A method 300 is described with respect to the system 100 shown in FIG. 1 or 2 by way of example. The method may be performed by other systems. FIG. 3 shows the method 300 of estimating contention among resource consumers in a contention region in a shared resource environment. At 301, the load generator 120 determines measurements of performance of the shared resources 130 in the contention region 120 from the probe 102. Examples of performance measurements include response time to establish a new TCP/IP connection and serve a web page or estimated cache misses. At 302, the load generator compares the measurements to benchmarks. The benchmarks may include values representing a desired performance. The benchmarks may be determined from measurements of the probe 102 running in isolation in the contention region 110 where there is no contention with other resource consumers. At 303, the load generator 120 determines a contention value representative of an amount of contention among the resource consumers running in the contention region based on the comparison. The contention value may be the f value described above or an amount of contention above a benchmark.

Some or all of the method and operations and functions described above may be provided as machine readable instructions executable by a processor and stored on a non-transitory computer readable storage medium. For example, they may exist as program(s) comprised of program instructions in source code, object code, executable code or other formats.

Figure 4:
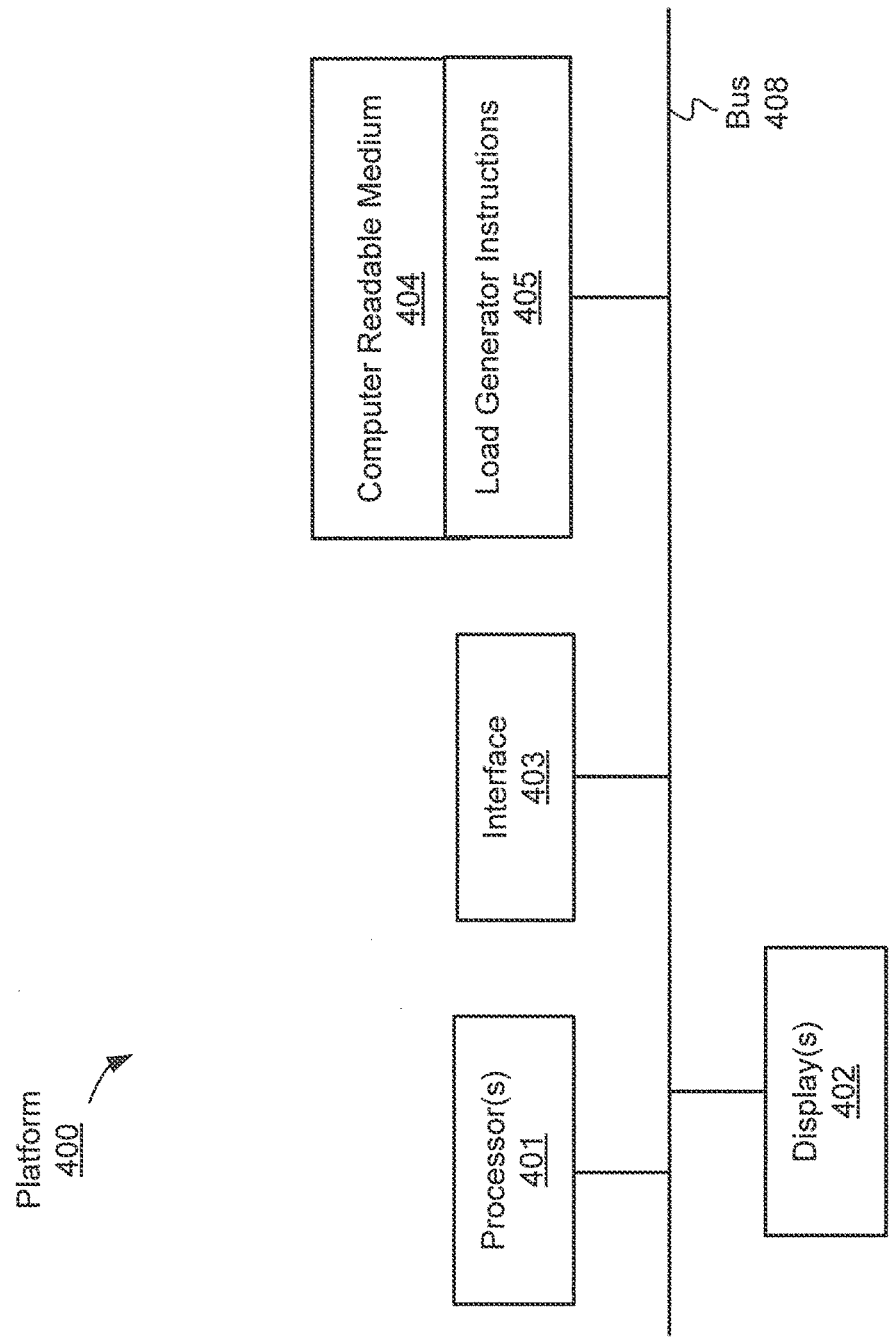
FIG. 4 illustrates a computer system that is operable to be used for the system in FIG. 1 or 2.

Referring to FIG. 4, there is shown a computer platform 400 for the load generator 120. It is understood that the illustration of the platform 400 is a generalized illustration and that the platform 400 may include additional components and that some of the components described may be removed and/or modified without departing from a scope of the platform 400.

The platform 400 includes processor(s) 401, such as a central processing unit, ASIC or other type of processing circuit; a display 402 and/or other input/output devices, an interface 403, such as a network interface to a Local Area Network (LAN), a wireless 802.11x LAN, a 3G or 4G mobile WAN or a WiMax WAN; and a computer-readable medium 404. Each of these components may be operatively coupled to a bus 408. A non-transitory computer readable medium (CRM), such as CRM 404 may be any suitable medium which stores instructions for execution by the processor(s) 401 for execution. For example, the CRM 404 may be non-volatile media, such as a magnetic disk or solid-state non-volatile memory or volatile media. The CRM 404 may include machine instructions 405 for the load generator 120.

While embodiments have been described with reference to the disclosure above, those skilled in the art are able to make various modifications to the described embodiments without departing from the scope of the embodiments as described in the following claims, and their equivalents.

What is claimed is:

1. A shared resource environment contention determination system comprising:
   a load generator executed by a processor to determine measurements from a probe, simulating a resource consumer, running with virtual machines (VMs) in a contention region in a shared resource environment, wherein the measurements measure performance of shared resources utilized by the probe and the VMs in the contention region, compare the measurements to benchmarks, and determine a contention value representative of an amount of contention among the VMs running in the contention region based on the comparison, wherein the contention comprises interference among the VMs utilizing the shared resources,
   wherein an available capacity of a shared resource in the contention region is calculated based on the contention value,
   wherein the available capacity comprises a number of shares of one of the shared resources that are available for allocation to a VM in the contention region, and the available capacity A is equal to C−f(P+N), wherein C is total capacity in terms of shares of the shared resource, f is the contention value, P is a number of shares already provisioned and N is a number of shares required for an additional VM in the contention region.

2. The system of claim 1, wherein the shared resources in the contention region include a virtual machine monitor and an L3 cache.

3. The system of claim 2, wherein the measurements for the shared resources comprise connection arrival rates measured for the virtual machine monitor and cache misses measured for the L3 cache.

4. The system of claim 1, wherein the contention causes degradation in performance of applications running on the VMs that is determined from the contention value.

5. The system of claim 1, wherein the probe comprises code executed in the contention region to simulate an operation of an application running on a VM in the contention region.

6. The system of claim 1, wherein the measurements are for metrics measuring the performance of the shared resources in the contention region, and the benchmarks comprise measurements for the metrics measured by the probe running in the contention region in isolation without sharing the shared resources with the VMs.

7. The system of claim 1, wherein the probe is tuned based on a type of the shared resource being measured and attributes of the shared resource.

8. The system of claim 1, wherein the load generator is to determine if the amount of contention exceeds a threshold and to report the contention value to a management system to control the VMs if the amount of contention exceeds the threshold.

9. The system of claim 8, wherein the management system is to migrate a VM to reduce the impact of contention on the VMs in response to the amount of contention exceeding the threshold.

10. A method of estimating contention among resource consumers in a contention region in a shared resource environment, the method comprising:
    determining measurements of performance of shared resources in the contention region from a probe running with the resource consumers and simulating a workload on the shared resources;
    comparing the measurements to benchmarks; and
    determining, by a processor, a contention value representative of an amount of contention among the resource consumers running in the contention region based on the comparison,
    wherein the contention comprises interference among the resource consumers and the probe utilizing shared resources in the contention region and the contention causes a degradation in performance of the resource consumers,
    wherein an available capacity of a shared resource in the contention region is calculated based on the contention value,
    wherein the available capacity comprises a number of shares of one of the shared resources that are available for allocation to a VM in the contention region, and the available capacity A is equal to C−f(P+N), wherein C is total capacity in terms of shares of the shared resource, f is the contention value, P is a number of shares already provisioned and N is a number of shares required for an additional VM in the contention region.

11. The method of claim 10, comprising:
    determining if the amount of contention exceeds a threshold; and
    sending the contention value to a management system if the amount of contention exceeds the threshold to control consumption of the shared resources by the resource consumers based on the contention value.

12. The method of claim 10, wherein the resource consumers comprise VMs running applications or applications not running on a VM.

13. The method of claim 10, wherein the probe comprises code executed in the contention region to simulate an operation of an application running on a VM in the contention region.

14. The method of claim 10, wherein the contention causes degradation in performance of a plurality of applications running on a plurality of VMs that is determined from the contention value.

15. The method of claim 10, wherein determining measurements of performance of a virtual machine monitor and an L3 cache in a contention region further comprises determining if the amount of contention exceeds a threshold and to report the contention value to a management system to control a plurality of VMs if the amount of contention exceeds the threshold.

16. A non-transitory computer readable medium including machine readable instructions executable by at least one processor to:
    determine measurements of performance of a virtual machine monitor and an L3 cache in a contention region
    from a probe running with VMs in the contention region, wherein the probe simulates a VM running in the contention region;
    compare the measurements to benchmarks; and
    determine a contention value representative of an amount of contention among the VMs running in the contention region based on the comparison, wherein the contention comprises interference among the VMs using the virtual machine monitor and the L3 cache;
    wherein an available capacity of a shared resource in the contention region is calculated based on the contention value; and
    wherein the available capacity comprises a number of shares of one of the shared resources that are available for allocation to a VM in the contention region, and the available capacity A is equal to C−f(P+N), wherein C is total capacity in terms of shares of the shared resource, f is the contention value, P is a number of shares already provisioned and N is a number of shares required for an additional VM in the contention region.

17. The non-transitory computer readable medium of claim 16, wherein the probe comprises code executed in the contention region to simulate an operation of an application running on a VM in the contention region.

18. The non-transitory computer readable medium of claim 16, wherein the probe is tuned based on a type of the shared resource being measured and attributes of the shared resource.

* * * * *